Feb. 2, 1960     H. G. TWIFORD     2,923,346
BEAD PROTECTOR
Filed Dec. 26, 1956

INVENTOR.
Harry G. Twiford
BY
ATTORNEYS

United States Patent Office 2,923,346
Patented Feb. 2, 1960

2,923,346
BEAD PROTECTOR
Harry G. Twiford, Denver, Colo.

Application December 26, 1956, Serial No. 630,621

3 Claims. (Cl. 157—1)

This invention relates to a bead protector arranged to be mounted on a drop-center of a pneumatic tire vehicle wheel rim during the mounting of a pneumatic tire on the rim so as to prevent the tire bead from coming into contact with the edge of the rim and thereby prevent damage to the bead of the pneumatic tire.

With extensive use of tubeless tires, the mounting and dismounting of the tires from drop-center wheels has become a critical problem. The tires are very difficult to put on and remove from the wheel without damage to either the wheel or tire. The junction between the tire bead and the bead groove of the drop-center wheel is the only connection between the wheel and the tire preventing the escape of contained air. It is essential, therefore, that the bead of the tire and the bead groove of the wheel be free from damage such as nicks, scratches and cuts so that an effective seal may be provided completely around each of the tire beads. With the recent development of smaller-diameter wheels, that is 14-inch wheels or smaller, the mounting and dismounting of the tires from the wheels becomes an even more difficult problem, since the reduction of the diameter of the wheels reduces the total elasticity of the tire beads which have to be stretched over the rim of the wheel. Also, many of the smaller wheels have extremely sharp edges on the rims which cut the tire beads as they are being placed on the wheel.

According to the present invention, I have discovered a protective sheath which encloses the axially extending rim flange of the wheel and provides a smoothly-curved surface over which the bead of the tire may slide without touching the rim and, therefore, the tire may be placed on the wheel without the bead of the tire coming in contact with the wheel rim. The device is of annular form and provides a radial U-shaped sheath which is arranged to cover a major portion of a rim flange of a wheel. The device may have sufficient resiliency so that it may be utilized with various sizes of wheels. The sheath includes a positive lock means which secures it on a wheel and prevents rotation of the sheath as the tire is mounted thereover, and thereby substantially reduces the work required to mount the tire on the wheel.

Included among the objects and advantages of the present invention is a bead protector which is arranged to cover a major portion of the rim flange of a wheel and provides means for mounting a tire on a wheel without the bead of a tire coming in contact with the rim of the wheel. The device is adapted for use with various sizes of wheels to effectively prevent the bead of the tire coming in contact with the rim of the wheel. A stop means is provided to prevent movement of one side of the tire bead while the other side of the bead is being forced over the sheath into the drop center of a wheel. A positive lock mechanism is provided for securing the sheath on the rim of the wheel during tire-mounting operations.

These and other objects and advantages of the invention may be readily ascertained by referring to the following description and appended illustrations in which.

Figure 2:
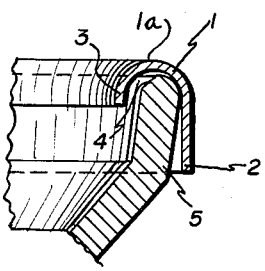
Fig. 2 is a cross-sectional view of an enlarged detail of the sheath taken along lines 2—2 of Fig. 1.

In the device selected for illustration, a substantially annular body 1 has a U-shaped cross section with the legs thereof extended axially of the annular body, indicated in Fig. 2. The annular body 1 includes an arcuate portion interconnecting an elongated outer leg or flange 2, which extends axially of a wheel on which it is mounted, and a shorter internal leg or flange 3, which is parallel with the flange 2. The body is arranged to seat on an edge 4 of an outwardly extending rim flange 5 of a wheel 6 with the elongated leg 2 on the periphery of the rim flange 5 extending into the tire well of the wheel. The annular body 1 may be of a flexible metal with sufficient resiliency so that it may be distorted to fit a variety of wheels of different diameters. It is not essential that the sheath enclose the complete rim flange of a wheel, a major portion of the rim flange being sufficient. While the annular body is flexible, it must also be sufficiently rigid to permit a tire bead to pass over it into the drop center of the wheel.

Figure 3:
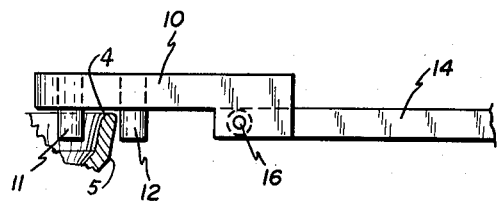
Fig. 3 is an enlarged side elevational view of a holding mechanism for one end of the bead-protecting sheath as viewed from the inner or concave side of the sheath.
Figure 4:
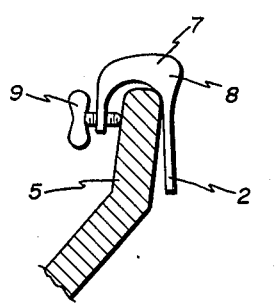
Fig. 4 is a sectional view of the details of the sheath lock means taken along section lines 4—4 of Fig. 1.

On one end of the annular body is an enlarged head 7 having an outwardly extending smoothly curved hump 8 which is integral with and is provided with a smooth junction into the elongated leg 2. The hump 8 extends beyond the maximum periphery of the sheath. A thumb screw 9 provides means for removably securing the annular body by end 7 to a wheel rim 5. The opposite end of the annular body includes a friction grip head 10, shown in detail in Fig. 3, which includes a forward roll pin 11 and a rearward roll pin 12 both pins extending in a substantially axial direction of the wheel toward the rim well thereof when said annular body is mounted on the rim flange. The end of the U-shaped band has the inner leg 3 and the connecting arcuate member 1a removed at 15 leaving an outwardly extending flat strip or band 14 as an extension of flange 2. The band 14 is connected to the head 10 by means of a fastening element 16. The fastening element may be a rivet, bolt and nut or other suitable fastening.

Figure 1:
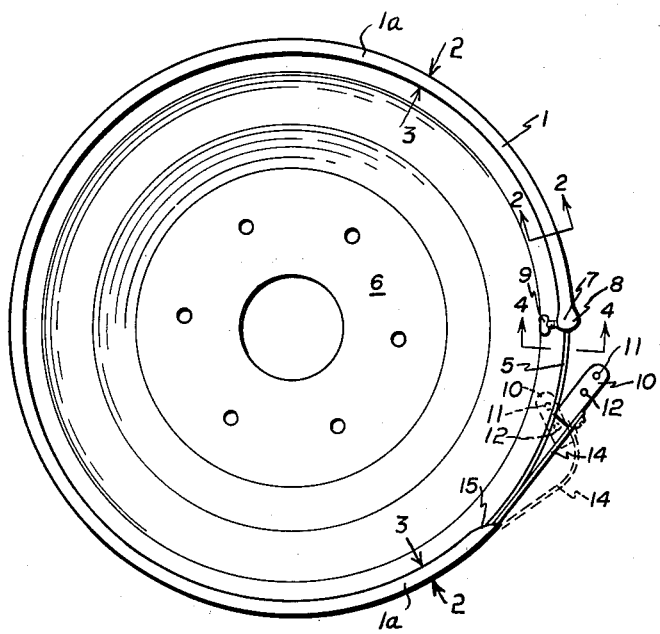
Fig. 1 is a top plan view of a sheath, according to the invention, mounted on a drop-center rim or wheel illustrating its position during tire-mounting operations.

In using the bead protector of the invention, the head 10 is turned inwardly toward the axle of wheel 6 and the roller pins are straddled over the rim 5 of a wheel 6 with pin 11 on the inner side of the flange 5 and the pin 12 on the outer side of the flange 5. The annular sheath 1 is then placed over the rim of the wheel, as indicated in Fig. 2. On placing the sheath over the rim flange, the band 14 is bent into the shape shown in the dashed lines 14 of Fig. 1, providing a spring action against the pins on either side of the rim holding them wedged against the rim flange 5. The end 7 is secured to the rim by means of the thumb screw 9, and the device is in position to protect the bead of a tire which is placed over the wheel. The tire is placed on the drop center wheel so that a portion of the lower bead encompasses the space between the ends 10 and 7 of the annular body. One portion of the lower tire bead is hooked under the projection 8 and the other portion of the bead is hooked under the band 14, shown in dashed lines in Fig. 1. The tire is then mounted on the wheel by forcing the lower tire bead over the annular body from the end 14 clockwise around to the end 7 so that the lower bead is forced into the tire well. The upper tire bead is similarly placed over the bead protector with a portion hooked under the projection 8 and the head 10. The upper bead is then forced over the bead protector into the tire well completing the mounting. The projections 7 and 8 hold the one portion of the bead in the drop center at end 7 while the remainder of the bead is mounted over the rim.

The smoothly curved surface of the annular body permits the tire bead to be rolled over the rim flange across the leg 2 into the drop center without damage to the bead, and the bead stop 8 greatly simplifies the work of passing the bead over the wheel rim by holding one portion of the bead to prevent it from popping up over the rim as the remainder is placed over the rim. The tire bead is thus placed on the wheel into the drop center without touching the rim or the edge of the rim of the wheel. After both beads of the tire are placed in the drop center of the wheel, the thumb screw is loosened and the annular body is quickly removed relieving the spring tension of the pins on the rim flange 5 so that the head is easily removed.

The releasable lock on the end 10 is an effective and efficient way of releasably locking an end of the annular body on the rim which securely holds the annular body on the rim and still permits some give as the tire is placed on the wheel. It is obvious, however, that various means may be used to secure the end to the rim, as for example, another thumb screw. The bead stop on end 7 performs an effective and efficient function of holding one portion of the bead in position while the remainder of the bead is being manipulated. In some instances it may be desirable to have no stop on the end, in which case the tire will be placed over the wheel by manipulating the bead on both sides of the end as is commonly practiced in the tire-mounting art. In either case, however, the annular sheath completely covers the edge of the rim of the wheel and prevents any contact between the tire bead and the wheel rim.

While the invention has been illustrated by reference to a specific embodiment, there is no intent to limit the concept or the scope of the invention to the precise details so set forth, except insofar as defined in the following claims.

I claim:
1. A device for protecting beads of a pneumatic tire on mounting the same on a drop-center wheel, comprising a substantially annular sheath having an axially U-shaped cross section and arranged to seat on and cover a major portion of a rim flange of a wheel with one leg extending a substantial distance on each side of the rim flange and provide a smoothly curved surface over such a rim flange, one end of said sheath having releasable lock means thereon for releasably securing the same on a wheel, tire bead stop means on said sheath adjacent said lock means for holding a tire bead during the mounting operation of a tire on a wheel, and means on the opposite end of said sheath for releasably holding said sheath on a rim flange.

2. A device according to claim 1 in which the tire bead stop means is a member projecting beyond the peripheral extend of the sheath.

3. A device for protecting the beads of a pneumatic tire on mounting the same on a drop-center wheel, comprising a substantially annular sheath having a U-shaped cross section with the legs thereof extended axially, said sheath arranged to seat on and cover a major portion of a rim flange of a wheel, the outer leg of said U-shaped member being of greater length than the inner leg thereof and arranged to extend a substantial distance over the rim flange of the wheel into the tire well of the wheel, the outer and inner legs of said member being joined by a smoothly curved joining surface interconnecting said legs to provide a smooth covering over the rim flange, one end of said sheath having lock means for releasably secured the same on a rim flange, tire bead stop means mounted adjacent said lock means for holding a tire bead during mounting operations of a tire on the wheel, and means on the opposite end of said sheath for releasably holding said sheath on a rim flange.

References Cited in the file of this patent

UNITED STATES PATENTS

| | | |
|---|---|---|
| 1,333,647 | Weaver | Mar. 16, 1920 |
| 1,491,479 | Holben | Apr. 22, 1924 |